C. J. LANDGRAF.
SPARE TIRE HOLDER FOR VEHICLES.
APPLICATION FILED MAY 18, 1918.

1,292,813.

Patented Jan. 28, 1919.
2 SHEETS—SHEET 1.

Witness
Edwin J. Beller.

Inventor
Carl J. Landgraf.
by Raymond J. Mawhinney
Attorney.

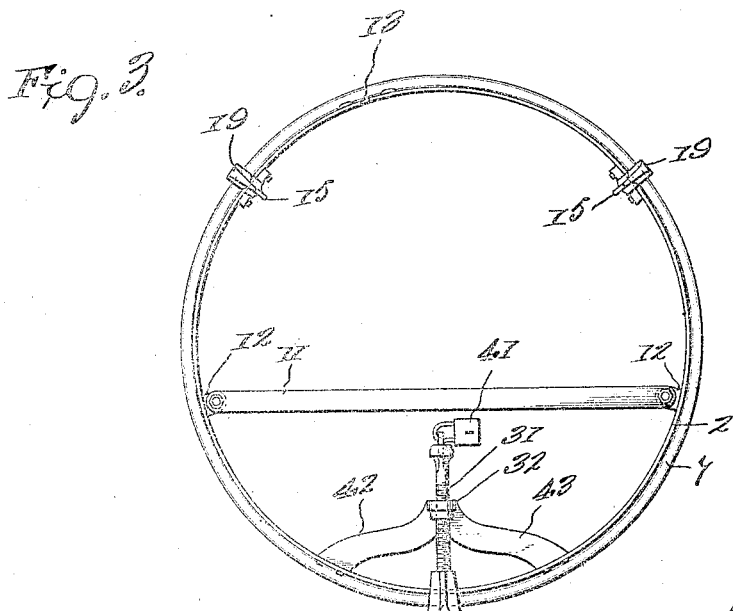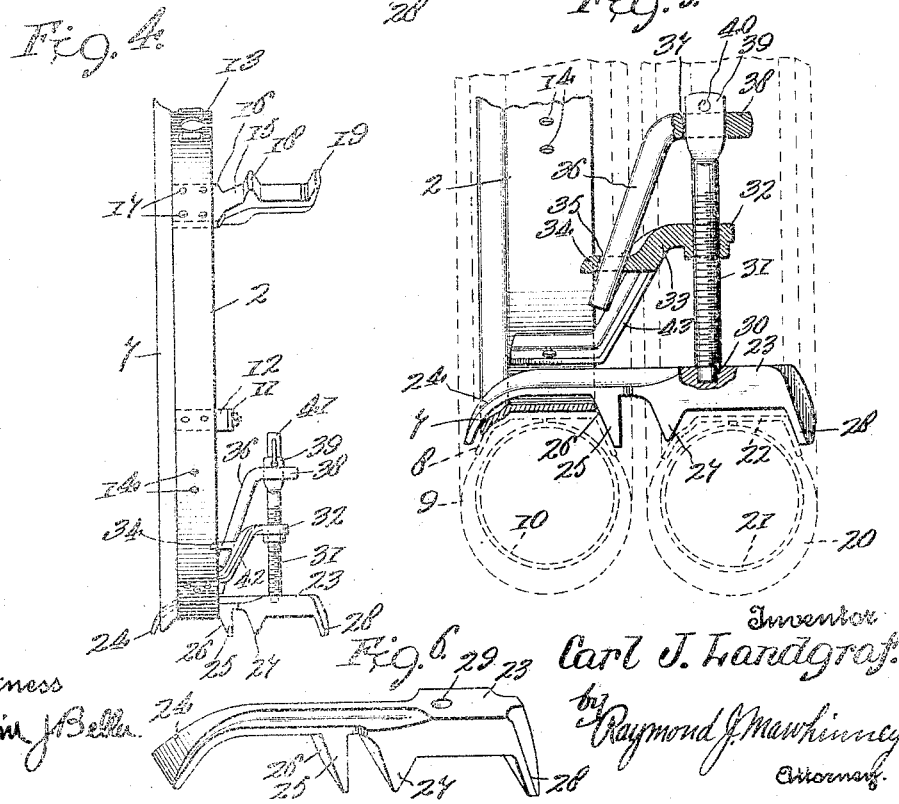

UNITED STATES PATENT OFFICE.

CARL JOSEPH LANDGRAF, OF PROVIDENCE, RHODE ISLAND.

SPARE-TIRE HOLDER FOR VEHICLES.

1,292,813.          Specification of Letters Patent.     Patented Jan. 28, 1919.

Application filed May 18, 1918. Serial No. 235,300.

*To all whom it may concern:*

Be it known that I, CARL JOSEPH LANDGRAF, a citizen of the United States, residing at Providence, in the county of Providence and State of Rhode Island, have invented certain new and useful Improvements in Spare-Tire Holders for Vehicles; and I do hereby declare the following to be a full, clear, and exact description of the invention, such as will enable others skilled in the art to which it appertains to make and use the same.

The present invention relates generally to improvements in spare tire holders for vehicles, and more specifically consists in equipping certain types of existing tire holders with additional parts of novel construction which enables me to carry two spare tires.

It is an object of my invention to provide a tire-holder of the above general character, the component parts of which are such as to be cheap to manufacture, few in number, adapted to be readily assembled, and capable of convenient and quick operation.

Another object of the invention resides in the provision of means whereby the tires will be locked in place in the holders to prevent their unauthorized removal or theft.

Other objects and advantages of my invention will be apparent from the following description, taken in conjunction with the accompanying drawings, in which I have illustrated my invention as applied to the single tire-holder to be found on the "Dodge" automobile. The invention, of course, may be applied to other tire-holders.

The drawings show only one specific form of the invention; but it will be readily appreciated that such invention is susceptible of embodiment in numerous other mechanical forms.

In the drawings, wherein like parts are designated by like symbols throughout the several views:

Fig. 3 is a plan view on an enlarged scale of the tire holder.

Fig. 4 is an end view of the same.

Fig. 5 is an enlarged sectional view with a fragmentary showing of certain of the parts and with the tires appearing in dotted lines; and Fig. 6 is a perspective view of the improved clamp bar.

Figure 1:
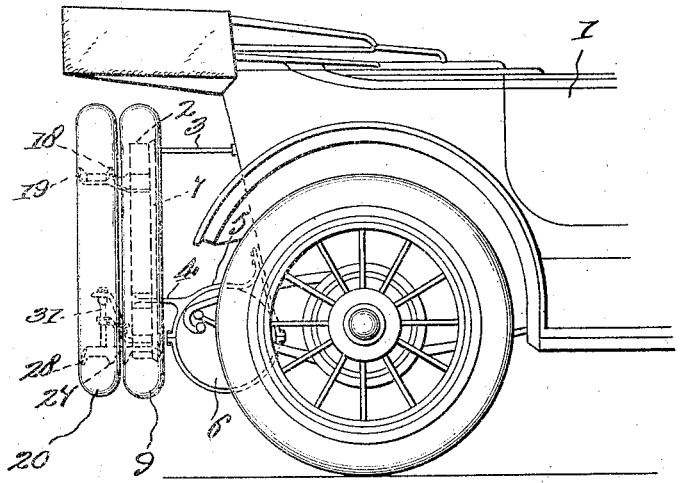
Figure 1 is a fragmentary side elevational view of a vehicle showing attached an improved tire holder constructed in accordance with my invention.

Reference is now to be had in detail to the drawings, where 1 designates a "Dodge" automobile or other vehicle having the necessity of carrying spare tires, and 2 represents the ring usually found supported at the rear of "Dodge" machines. This ring 2 is held in a substantially vertical position by the customary iron 3 at the top and by the customary arms 4 at the sides, which arms 4 form extensions of the straps 5 that are employed to carry the fuel tank 6.

An annular curved flange 7 is carried at the forward peripheral edge of the ring 2, this flange being constructed to conform to one side of a demountable rim 8 shown in dotted lines in Fig. 5. The other or rear peripheral edge of the ring 2 is left free and unobstructed to allow the demountable rim 8 to be fitted over, and removed from, the ring in the manner now usually practised. A shoe 9 containing the inflated inner tube 10 is shown in place on the demountable rim 8 in Fig. 5.

The present practice is to employ lugs that are bolted to the ring 2 in order to confine the demountable rim and tire in place, but I dispense with the use of said lugs and prevent the escape of the tire by other means hereinafter more fully described.

Figure 2:
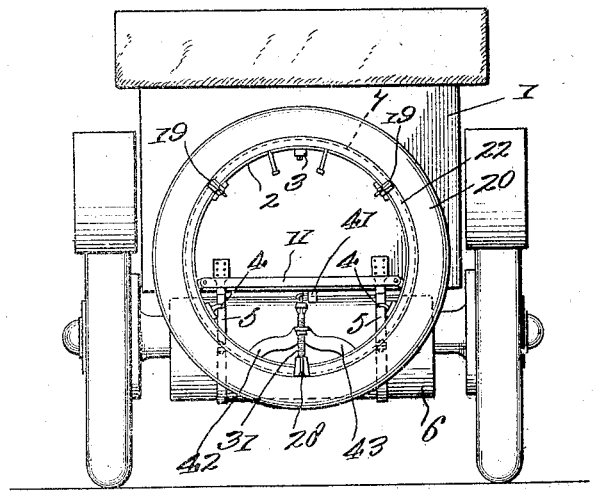
Fig. 2 is a rear end view of the vehicle with the improved tire holder thereon.

The bar 11, which appears in Figs. 2, 3 and 4, is the same bar to which the license number plates and tail lamp are affixed, and such bar is attached to the angle irons 12, which are bolted or otherwise secured to the ring 2. The opening 13 shown in the ring 2 in Fig. 4, is made to receive the valve stem of the inner tube 10, and the holes 14 are for the passage of the rivets or other fastenings whereby the ring 2 is attached to the arms 4.

The parts so far described are those at present employed on the "Dodge" automobile for holding a single spare tire. I will now proceed to describe my invention.

In accordance with such invention I provide one or more tire-holders or tire-irons 15, each of which are preferably made with flat plates 16 adapted to be fitted against the interior side of the ring 2 and riveted or otherwise secured thereto as indicated at 17 in Fig. 4. Such tire-holders or tire-irons 15 project at right angles from the ring 2 and are channeled to receive a second spare tire.

This channeled formation is imparted by spaced jaws 18 and 19 that are carried by the holders 15. From an inspection of Figs. 2 and 3 it will be seen that I prefer to employ two such holders 15 and to place one at one, and the other at the opposite, side of the vertical center of the ring 2, as this arrangement provides for the adequate support of the spare tire with a minimum of parts.

The second spare tire supported in the holders 15 is indicated in dotted lines in Fig. 5, in which 20 represents the outer shoe or casing, 21 the inner tube and 22 the demountable rim.

A clamp bar 23, arranged to reciprocate radially with respect to the two spare tires, carries a curved part 24 adapted to take against the interior of the curved flange 7 in order to guide the bar in its movement and cause it to shift to the left, speaking in relation to the position it occupies in Fig. 5, so that a jaw 25, also carried by said clamp bar 23, may be made to move tightly against the free and unobstructed peripheral edge of the ring 2, beyond which the beveled face 26 of said jaw 25 projects, where it engages against the side of the demountable rim 7 to confine same in place on said ring. The curved part 24 and jaw 25 together form a channel in the clamp bar 23, which is received by the ring 2. The clamp bar 23 also extends within the second spare tire and carries the spaced jaws 27 and 28 suitably beveled and forming a channel to receive the demountable rim 22. The various parts carried by the clamp bar may be formed in one piece therewith as shown or be made separately and attached thereto as desired.

In the base of the clamp bar 23 is made a socket 29 occupied by the reduced end 30 of a screw bolt 31, which is disposed with its axis radially of the second spare tire. The screw bolt 31 has threaded engagement with a screw threaded perforation made in the lateral extension 32 of a head 33, which also carries an oppositely-projecting lateral extension 34 pierced by a diagonal perforation 35. The head 33 forms part of a bracket which includes the outwardly curved diverging arms 42 and 43 having their free ends fitted within and secured to the inside of the ring 2, by which the head and extensions are supported.

A diagonal latch bolt 36 is adapted to have one end engaged through the perforation 35 in the head extension 34 and to have the slot 37 formed in its angular end 38 fitted over the flattened end 39 of the screw bolt 31. In the position shown in Fig. 5 the latch bolt will prevent the rotation of the screw bolt. A perforation 40 in the flattened end 39 of the screw bolt is provided to receive a padlock 41 whereby withdrawal of the latch bolt by unauthorized persons will be prevented and theft of either of the spare tires made impracticable. The screw bolt 31 may be rotated by hand for which purpose the flattened end 39 forms a convenient grip, but if preferred a rod or stick may be passed through the perforation 40 to gain added leverage that the operation may be rendered the more easy.

Whenever a blowout or other trouble occurs resulting in the deflation of one of the wheel tires and it becomes necessary to substitute one of the spare tires, the proprietor of the automobile has only to remove the padlock 41 after unlocking same by means of a key, which he retains for security about his person, which leaves him free to lift the latch bolt 36 from engagement with the screw bolt 31 and to thereupon rotate the latter in a left-hand or counter-clockwise direction. So moved in such direction the screw bolt will recede radially inward and will allow the clamp bar to retire inwardly until its jaws pass within the path of the demountable rims. The second spare tire which is the outermost may then be swung outwardly from the clamp bar and lifted off the holders 15.

In placing the deflated tire or a fresh inflated tire on the improved device, the upper part of the demountable rim is first engaged with the holders 15 and the rim then permitted to swing down beneath the clamp bar, which may then be moved out to grip the same by the rotation of the screw bolt 31, this time in a right-hand or clockwise direction. The latch bolt is reëngaged with the screw bolt 31 and the padlock replaced.

When the second spare tire 20 is in place, it serves to render the first spare tire 9 inaccessible to thieves and prevents the latter's accidental displacement. If there is but the one spare tire 9 on the holder the jaw 25 will secure the same against removal or displacement.

It will be understood that shoes with or without inner tubes therein may be directly placed in the holders without being first fitted on the demountable rims or the empty rims may find a suitable support in the holders. The term "tire" or "tires" in the claims is used for convenience and is intended to cover all of these uses.

The screw bolt 31 may be tightened or set up by using diagonal latch bolt 36 in inverted position, placing slot 37 over flattened end 39 of screw bolt 31.

If but one spare tire or one spare rim is all that is carried by holder it should be fastened on outer part of tire holder and placed so as to be properly secured, as in manner when two tires are carried by the device.

It is obvious that those skilled in the art may vary the details of construction and arrangements of parts without departing from the spirit of my invention, and therefore I do not wish to be limited to such features except as may be required by the claims.

I claim:

1. A device of the character described including means to hold a first tire or rim on a vehicle, means to hold a second tire or rim on the vehicle, a movable clamp bar adapted to receive both the first and second spare tires or rims, a bracket projecting into the space within the second tire or rim, a bolt rotatably mounted in said bracket and arranged to force said clamp bar outwardly, means arranged to be engaged with said bolt and bracket to prevent the bolt's rotation, and a lock to prevent the removal of said last-named means.

2. The combination with a vehicle, supporting means carried on said vehicle, and a tire-holder held on said supporting means, of means for supporting a second tire or rim alongside the tire or rim held on said tire-holder, a reciprocating clamp bar having two channels, one channel adapted to receive one and the other channel the other tire or rim, a bracket suitably supported having a part extending within said second tire or rim, a reciprocating bolt supported in said bracket and adapted to force said clamp bar to the outward position, and means for locking said bolt.

3. The combination with a vehicle, supports carried on said vehicle, and a tire-holder held on said supports, said tire-holder having means adapted to confine a tire at one side, of means attached to and projecting from said tire-holder whereby to receive a second tire or rim, a reciprocating clamp bar having two channels, one channel receiving each of said tires or rims, a bracket attached to and extending beyond said tire-holder and within the second spare tire or rim, a reciprocating bolt supported in said bracket and adapted to force said clamp bar to the outward position, and means for locking said bolt against motion.

4. The combination with means for supporting a spare tire or rim on a vehicle, of means for carrying a second spare tire or rim alongside said first-mentioned tire or rim, a bracket, a head forming a part of said bracket and having an opening therein, a movable bolt carried by said bracket, means to engage said second named spare tire and adapted to prevent its removal from said holder, said last-named means being arranged to be moved to engage said second-named spare tire, or rim by said movable bolt, a latch bolt slidably fitting in the opening in said head and having a part thereof adapted to engage with said movable bolt to hold same against motion, and a lock to prevent the disengagement of said latch bolt from said movable bolt.

5. A device for holding a spare tire including supporting means for receiving a spare tire or rim, a reciprocating clamp bar having a channel to receive the tire or rim a bracket suitably supported from the vehicle and projecting into the space within said spare tire or rim, a reciprocating and rotating bolt supported in said bracket, said bolt adapted to force said clamp bar outwardly, the inner end of said bolt being flattened and perforated, a part on said bracket having an opening, a locking bolt adapted to fit at one end into the opening in said bracket part, the other end of said locking bolt being bent and provided with a slot to fit about the flattened end of said reciprocating and rotating bolt, and a padlock having its shackle passing through the perforation in the flattened end of said reciprocating and rotating bolt, substantially as described.

6. The combination with supports on the rear of a vehicle, and a ring held on said supports, said ring carrying a tire or rim retaining flange at the forward edge thereof, the rear edge of the ring being open to receive a tire or rim, of tire-irons having plates secured to and supported from said ring, said tire-irons having channels to receive a second tire or rim, a clamp bar having channels to receive both the tires or rims, a screw bolt adapted to force said clamp bar outwardly, a bracket having arms secured to said ring, said bracket supporting said screw bolt and having an opening therein, a latch bolt fitting at one end removably in said opening, the other end of the latch bolt adapted to engage with and prevent the turning of said screw bolt, and a padlock for securing the latch bolt in place.

7. The combination with a vehicle, means on said vehicle for supporting a tire-holder, and a ring held on said means and adapted to receive a tire or rim, said ring having at one edge thereof a flange to confine the tire at one side, of channeled holders attached to and projecting from said ring whereby to receive a second tire or rim, a reciprocating clamp having a channel to receive said ring and a second channel to tightly receive the second tire or rim, a bracket attached to and extending beyond said ring, a screw bolt having threaded engagement with said bracket and adapted to force said clamp bar to the outward position, and means for locking said screw bolt against rotation.

8. The combination with means for supporting a spare tire on a vehicle, of holders supported and projecting from said means whereby to carry a second spare tire alongside said first-mentioned tire, a bracket also supported and projecting from said means, a head forming a part of said bracket and having an opening therein, a screw bolt having threaded engagement with said bracket, means to engage said second-named spare tire and adapted to prevent its removal from said holder, said last-named means being arranged to be moved to engage said second-named spare tire by said screw bolt, a latch bolt slidably fitting in the opening in said head and having a part thereof adapted to engage with said screw bolt to hold same against rotation, and a lock to prevent the disengagement of said latch bolt from said screw bolt.

9. In spare tire-holders for vehicles, the combination of a ring adapted to be supported from the vehicle and arranged to receive a spare tire, holders supported from said ring for receiving a second spare tire, a movable clamp bar adapted to engage the spare tires to prevent their removal, a bracket supported from said ring and composed of arms and a head formed at the junction of said arms, said head having lateral perforated extensions, the perforation in one extension being screw threaded, a screw bolt movable through said threaded perforation and acting to force said clamp bar into engagement with the tires, a latch bolt adapted to extend through the other perforation in said head and to have engagement with said screw bolt to prevent the turning of the latter, and a lock arranged to confine said latch bolt in place, substantially as described.

10. In spare tire-holders for vehicles, the combination of a ring arranged to be attached to the vehicle and adapted to support a spare tire, holders supported from said ring and adapted to receive a second spare tire, means for gripping the spare tires to hold them against removal, a bracket supported from said ring and having a head provided with lateral perforations, one of said perforations being threaded, a screw bolt passing through the threaded perforation and engaging with said gripping means to force same into engagement with the spare tires, said screw bolt having a flattened portion, a latch bolt provided with a slot to fit about the flattened portion of said screw bolt, the latch bolt also adapted to enter the other perforation in said bracket head whereby to secure the screw bolt against rotation, the screw bolt having a perforation to receive an operating bar and a padlock, substantially as described.

In testimony whereof, I affix my signature.

CARL JOSEPH LANDGRAF.